United States Patent [19]

Stecker, Sr.

[11] 4,017,093
[45] Apr. 12, 1977

[54] VEHICLE STEP

[76] Inventor: Alvin Stecker, Sr., Woden, Iowa 50485

[22] Filed: Sept. 12, 1975

[21] Appl. No.: 612,765

[52] U.S. Cl. .............................................. 280/163
[51] Int. Cl.² .......................................... B60R 3/02
[58] Field of Search ................. 280/163, 164, 166; 248/229, 228

[56] References Cited

UNITED STATES PATENTS

| 984,813 | 2/1911 | Hilton | 248/228 |
|---|---|---|---|
| 2,981,554 | 4/1961 | Mulder | 280/164 R |
| 3,561,786 | 2/1971 | Lentz | 280/166 |
| 3,758,134 | 9/1973 | Stewart | 280/163 |
| 3,887,217 | 6/1975 | Thomas | 280/166 |

*Primary Examiner*—Robert R. Song
*Attorney, Agent, or Firm*—Zarley, McKee, Thomte & Voorhees

[57] ABSTRACT

A step having a width substantially equal to the width of a person's feet is positioned on a pair of support arms extending angularly upwardly relative to the top surface of the step. The support arms terminate in upstanding portions which are engaged by a bracket assembly connecting them to the vehicle frame. The bracket assembly includes a first pair of plates on opposite sides of the vehicle frame and a third plate is positioned on the side of the upstanding portion opposite one of the pair of plates. Bolts interconnect the pair of plates and also the one plate to the third plate to rigidly connect the step to the frame of the vehicle. A brace extends from a point above the support arm connection to the upstanding portion and extends outwardly and downwardly to engagement with a side wall extending around the entire periphery of the step which includes a top plate having a plurality of elongated openings alternating with rows of circular openings over the substantial area of the plate.

7 Claims, 7 Drawing Figures

U.S. Patent
April 12, 1977
4,017,093
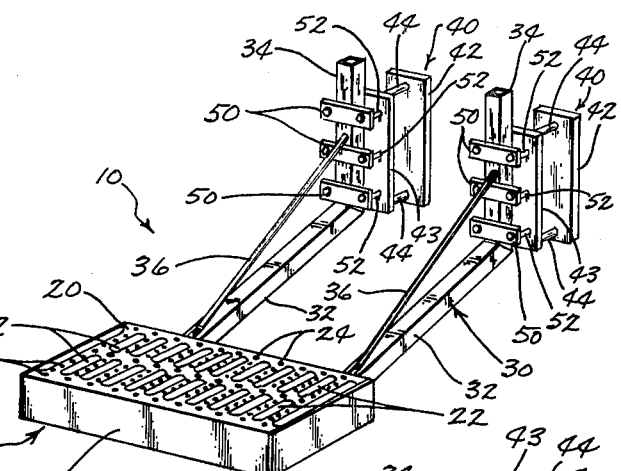
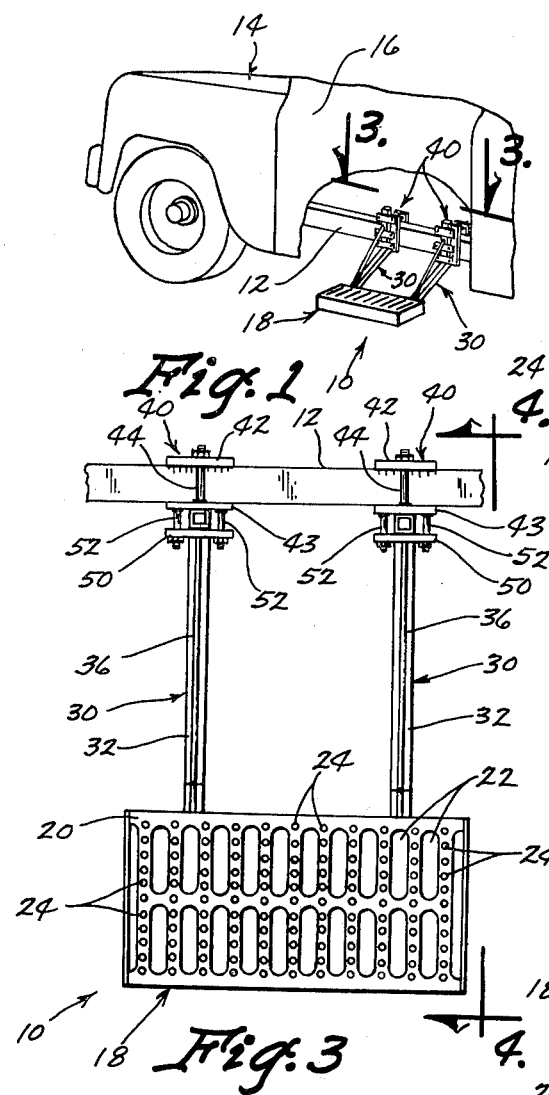
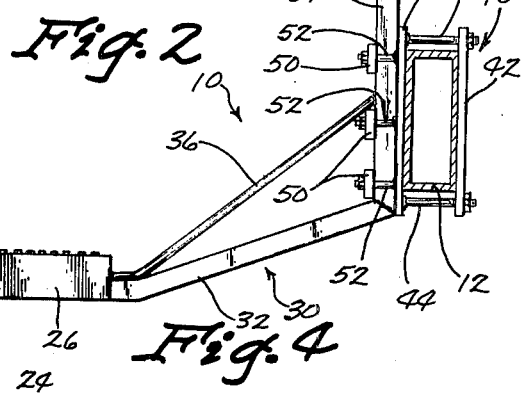
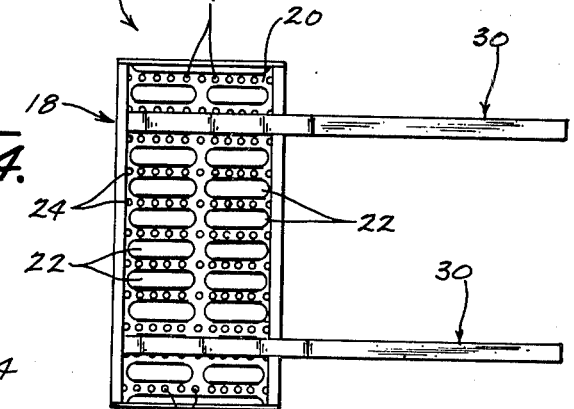
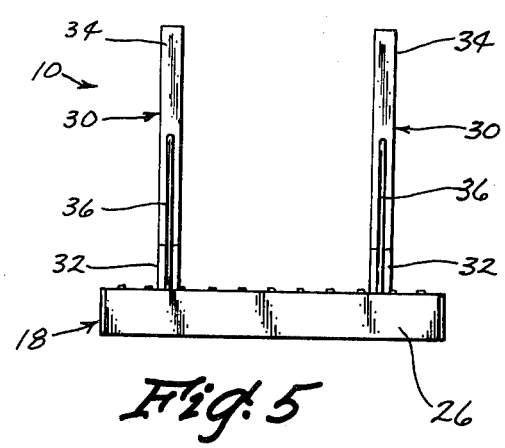
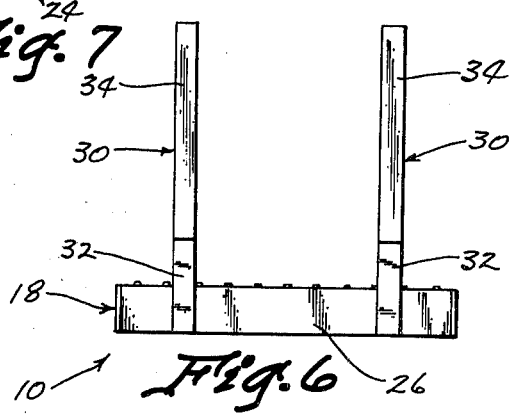

VEHICLE STEP

BACKGROUND OF THE INVENTION

Many vehicles including pickup trucks, trucks and all-terrain type vehicles have a high clearance between the frame and the ground and lack any means of getting into the cab. Thus, it is particularly difficult for older people, women or handicapped people to climb into the cab of these kinds of vehicles. The step of this invention makes it possible to eliminate this problem with existing vehicles by attaching a step to the vehicle frame.

SUMMARY OF THE INVENTION

The vehicle step of this invention may be easily attached to the vehicle frame by being connected to the longitudinally extending side frame member through use of a pair of clamping plates having bolts positioned on the top and bottom sides of the vehicle frame member. A plurality of additional bolts extend in the opposite direction and on opposite sides of upstanding portions of a pair of support arms extending outwardly and downwardly and under the step for engagement with the side wall along the outer side of the step. The plate which forms the top wall of the step includes a side wall extending around the entire periphery. A pair of brace members extend from the same side wall of the step upwardly and into engagement with the upstanding portions of the support arm above the outwardly extending portions of the support arm. The support arms extending outwardly and downwardly at an angle eliminate the need for downwardly extending portions directly below the vehicle frame which would have a tendency to limit the clearance of the vehicle directly under the frame. Also, the support step may be readily removed as desired through operation of the connecting bolts.

DESCRIPTION OF THE DRAWINGS

FIG. 1 is a fragmentary side perspective view of a vehicle with the step of this invention attached to its frame.

FIG. 2 is a perspective view of the vehicle step alone.

FIG. 3 is a top plan view taken along line 3 — 3 in FIG. 1.

FIG. 4 is a side elevation view taken along line 4 — 4 in FIG. 3.

FIG. 5 is a front elevation view of the step only.

FIG. 6 is a rear elevation view of the step only.

FIG. 7 is a bottom plan view of the step only.

DESCRIPTION OF THE INVENTION

The vehicle step of this invention is referred to generally in FIG. 1 by the reference numeral 10 and is shown mounted on the side frame member 12 of a truck 14 having a cab door 16.

The vehicle step 10 includes a step 18 formed from a sheet of metal 20 having alternating elongated openings 22 and rows of circular holes 24 over its substantial area. A downwardly extending wall 26 is connected to the peripheral edge of the plate 20. A wall 26 along the long sides of the step includes inwardly turned portions parallel to the top plate while the side wall along the ends of the step has only the width of the wall thickness as seen in FIG. 7. Step 18 is wide enough to accommodate a person's two feet spaced apart in a normal comfortable position.

A pair of mounting arms 30 extend between the step 18 and the vehicle frame 12. Each of the mounting arms 30 include a tubular square in cross section arm portion 32 extending upwardly and laterally outwardly from under the step and engagement with the outer side wall 26 along the long side of the step 18 and the arm portion 32 terminates in an upstanding portion 34 perpendicular to the step 18. A rod brace 36 extends from the median portion of the upstanding portion 34 down to the inside side wall 26 just above the arm portion 32. It is seen that a maximum amount of clearance is provided directly under the upstanding portion 34 by the arm portion 32 extending angularly downwardly and outwardly rather than having the arm portion 32 and upstanding portion 34 extending at right angles to each other.

Mounting brackets 40 are provided and include a first pair of clamping plates 42 and 43 for embracing the frame member 12 of the vehicle 14 with locking bolts 44 on top and bottom sides thereof. The clamping plate 43 cooperates with a trio of horizontally oriented plates 50 positioned on the opposite side of the upstanding portion 34 to clamp the support arm 30 to the vehicle frame 12 through operation of the horizontally spaced apart bolts 52 connecting each plate 50 to the clamping plate 43. Bolts 40 and 52 are welded to opposite sides of the plate 43 and thus extend in opposite directions to engage the plates 42 and 50. It is thus seen that the clamping plates 42 and 43 allow for vertical adjustment of the step assembly 10 relative to the vehicle frame 12 and also the clamping plates 50 and 43 allow vertical adjustment of the support arm portions 34 relative to the bracket assemblies 40 to provide further vertical adjustment. Further horizontal adjustment is also possible on the frame member 12 as well as between the brackets 40 and the support arms 30.

I claim:

1. A vehicle step assembly for being attached to the frame of a vehicle comprising, a step having width substantially equal to the width of a person's pair of feet, a pair of spaced apart support arms connected to said step and extending angularly upwardly relative to the top surface of said step and terminating in upstanding portions extending perpendicularly to a plane of said step top surface, a pair of bracket assemblies for connecting said upstanding portions to the frame of a vehicle, each bracket assembly including a pair of clamping plates for engaging opposite sides of said vehicle frame, and means being provided for connecting one of said clamping plates to said upstanding portion, and each of said bracket assemblies, and said connecting means including a third clamping plate for engaging said upstanding portion on one side with said one plate of said pair of plates engaging said upstanding portion on the opposite side and said one of said pair of plates also adapted to engage one side of said vehicle frame.

2. The structure of claim 1 wherein each of said support arms includes a brace extending from said step to said upstanding portion at a point spaced above said support arm and its connection to said upstanding portion, and said brace extends at angle to said step and upwardly relative to the plane of said top surface.

3. The structure of claim 1 wherein said step includes a plate having said step top surface and a downwardly extending wall extends around the entire periphery of said plate and said support arms are connected to said wall along one side of said step.

4. The structure of claim 3 wherein said plate having said top surface includes a plurality of elongated openings alternating with rows of circular openings over the substantial area of said top surface.

5. The structure of claim 4 wherein said means for connecting said pair of clamping plates to said upstanding portion includes a pair of bolts horizontally aligned and positioned on opposite sides of said upstanding portion connecting said third clamping plate to said one plate of said pair of plates.

6. The structure of claim 5 wherein said pair of clamping plates includes a pair of bolts vertically aligned and adapted to be positioned on opposite sides of vehicle frame.

7. The structure of claim 3 wherein said one wall connected to said support arms is the outer wall of said step and said arms extend under the opposite side wall and said step and terminate in engagement with said one side wall.

* * * * *